(12) United States Patent
Jørgensen

(10) Patent No.: US 9,557,442 B2
(45) Date of Patent: Jan. 31, 2017

(54) BOREHOLE SEISMIC INVERSION IN ANISOTROPIC FORMATION

(75) Inventor: Ole Jørgensen, Virum (DK)

(73) Assignee: MAERSK OLIE OG GAS A/S, Copenhagen K (DK)

(*) Notice: Subject to any disclaimer, the term of this patent is extended or adjusted under 35 U.S.C. 154(b) by 386 days.

(21) Appl. No.: 12/704,369

(22) Filed: Feb. 11, 2010

(65) Prior Publication Data
US 2010/0211365 A1    Aug. 19, 2010

Related U.S. Application Data

(60) Provisional application No. 61/152,886, filed on Feb. 16, 2009.

(51) Int. Cl.
| | | |
|---|---|---|
| G01V 99/00 | (2009.01) | |
| G01V 1/28 | (2006.01) | |
| G01V 1/30 | (2006.01) | |

(52) U.S. Cl.
CPC ............ *G01V 99/00* (2013.01); *G01V 1/28* (2013.01); *G01V 1/306* (2013.01); *G01V 2210/67* (2013.01); *G01V 2210/675* (2013.01)

(58) Field of Classification Search
CPC ...... G01V 1/28; G01V 1/306; G01V 2210/67; G01V 2210/675; G01V 99/00
USPC ....................................... 703/10; 367/31, 73
See application file for complete search history.

(56) References Cited

U.S. PATENT DOCUMENTS

| | | | |
|---|---|---|---|
| 4,594,691 A | | 6/1986 | Kimball et al. |
| 4,794,572 A | * | 12/1988 | Sondergeld et al. .......... 367/31 |
| 5,309,404 A | | 5/1994 | Kostek et al. |
| 5,387,767 A | | 2/1995 | Aron et al. |
| 5,416,697 A | * | 5/1995 | Goodman .......................... 702/9 |
| 5,583,825 A | * | 12/1996 | Carrazzone et al. ........... 367/31 |

(Continued)

FOREIGN PATENT DOCUMENTS

| | | |
|---|---|---|
| GB | 2392496 A | 3/2004 |
| WO | 2008024150 A2 | 2/2008 |
| WO | 2008024150 A3 | 10/2008 |

OTHER PUBLICATIONS

Finite element procedures in engineering analysis; Formulation of the Finite Element Method—Chap. 4, pp. 196-220; Formulation and Calculation of Isoparametric Finite Element Matrices—Chap. 5, pp. 341-363.

(Continued)

*Primary Examiner* — Akash Saxena
(74) *Attorney, Agent, or Firm* — Brinks Gilson & Lione

(57) ABSTRACT

A method of simulating a borehole acoustic response in an anisotropic formation of the crust of the earth includes formulating a geometric model of the formation. The geometric model includes a plurality of layers definable in a cylindrical coordinate system defined by an axial direction normal to each of the layers, a radial direction relative to the axial direction, and a circumferential direction relative to the axial direction. The method also includes formulating a computational model of wave propagation in the formation. The computational model includes field variables and a wave equation describing a behavior of the field variables. The field variables are represented as respective Fourier series expansions of Tr-periodic harmonics in the circumferential direction. The method also includes numerically solving the computational model.

24 Claims, 2 Drawing Sheets

(56) References Cited

U.S. PATENT DOCUMENTS

| | | | | |
|---|---|---|---|---|
| 5,838,633 | A * | 11/1998 | Sinha | 367/31 |
| 5,859,811 | A | 1/1999 | Miller | |
| 6,128,580 | A * | 10/2000 | Thomsen | 702/18 |
| 6,163,155 | A * | 12/2000 | Bittar | 702/7 |
| 6,302,221 | B1 * | 10/2001 | Hamman et al. | 175/50 |
| 6,640,089 | B1 * | 10/2003 | Kanaan et al. | 455/67.16 |
| 6,641,893 | B1 * | 11/2003 | Suresh et al. | 428/105 |
| 7,525,873 | B1 * | 4/2009 | Bush et al. | 367/73 |
| 7,529,151 | B2 * | 5/2009 | Korneev | G01V 1/50 181/106 |
| 2004/0019427 | A1 * | 1/2004 | San Martin et al. | 702/6 |
| 2004/0122594 | A1 * | 6/2004 | Matsuoka et al. | 702/11 |
| 2006/0034152 | A1 * | 2/2006 | Korneev | 367/31 |
| 2006/0256655 | A1 * | 11/2006 | Sinha et al. | 367/31 |
| 2009/0006000 | A1 * | 1/2009 | Shin | G01V 1/28 702/17 |
| 2009/0109794 | A1 * | 4/2009 | Sinha | 367/35 |
| 2009/0185446 | A1 * | 7/2009 | Zheng et al. | 367/31 |
| 2009/0210160 | A1 * | 8/2009 | Suarez-Rivera | G01V 11/00 702/6 |
| 2009/0225627 | A1 * | 9/2009 | Sinha et al. | 367/31 |
| 2010/0088035 | A1 * | 4/2010 | Etgen et al. | 702/16 |
| 2010/0142316 | A1 * | 6/2010 | Keers et al. | 367/15 |
| 2010/0202252 | A1 * | 8/2010 | Ounadjela et al. | 367/31 |
| 2010/0204971 | A1 * | 8/2010 | Yin et al. | 702/8 |
| 2011/0007604 | A1 * | 1/2011 | Liu | G01V 1/28 367/52 |
| 2011/0134719 | A1 * | 6/2011 | Kinoshita et al. | 367/31 |
| 2012/0051179 | A1 * | 3/2012 | Shin | G01V 1/28 367/50 |
| 2013/0289881 | A1 * | 10/2013 | Sinha | G01V 1/50 702/11 |
| 2015/0112656 | A1 * | 4/2015 | Rodriguez-Herrera | G01V 1/306 703/6 |

OTHER PUBLICATIONS

Jorgensen, O., "Ring-element analysis of layered orthotropic bodies," *Computer Methods in Applied Mechanics and Engineering*, 102 (1993), pp. 319-336.

Zheng, Y. et al., "Effects of tool eccentricity on wave dispersion properties in borehole acoustic logging while drilling," pp. 1-20.

Kaselow, "The Stress Sensitivity Approach—Theory and Application," Chapter 2, Published 2004.

* cited by examiner

BOREHOLE SEISMIC INVERSION IN ANISOTROPIC FORMATION

RELATED APPLICATIONS

This patent application claims the benefit of the filing date under 35 U.S.C. §119(e) of Provisional U.S. Patent Application Ser. No. 61/152,886, filed Feb. 16, 2009, the contents of which are hereby incorporated by reference in their entirety.

TECHNICAL FIELD

Disclosed are a method and a system for simulating acoustic properties of a formation of the crust of the earth.

BACKGROUND

The determination of physical properties of the formations encountered when drilling into the crust of the earth is of great interest in relation to the exploitation of hydrocarbon reservoirs or mining applications.

Several techniques are known for recording physical measurements along a borehole. The results of such techniques are frequently recorded in the form of a so-called well log which provides a record of one or more physical measurements as a function of depth in a well bore.

Such well logs are useful for identifying and correlating underground rocks, as well as for determining the mineralogy and physical properties of potential reservoir rocks and the nature of the fluids they contain. The process of determining the physical properties of the formation based on the measured data is generally referred to as data inversion. In particular, the physical properties may be determined from the measured data and a suitable physical model, for example as model parameters of the physical model which may be determined by fitting the measured data to the model.

One useful technique for determining the elastic properties of a formation includes acoustic measurements. Accordingly seismic inversion refers to the process of determining what physical characteristics of rocks and fluids could have produced a seismic record obtained, e.g. in response to acoustic stimuli generated by one or more acoustic sources at respective positions along the well.

To this end, efficient numerical simulation processes based on computational models of the acoustic properties of the formation are of interest in seismic inversion so as to estimate the physical properties of the formation in an efficient and accurate manner, e.g. to estimate the spatial distribution of elastic formation properties from given borehole acoustic measurements.

Formations encountered when drilling into the crust of the earth may be elastically anisotropic and the axis of anisotropy may change with depth. In order to model the measurements by sonic tools in highly anisotropic formations, and thereby to invert elastic properties from single well data, full 3-dimensional analyses of acoustic wave propagation is desirable.

However, the simulation of borehole acoustic problems has been found to be a difficult task, in particular because the computational simulation model used in the simulation needs to be sufficiently complex and accurate to capture the relevant physical mechanisms while remaining computationally tractable. The finite element method is capable of capturing almost any degree of complexity, e.g. layer by layer variations in elastic parameters and anisotropy, by using standard three dimensional isoparametric elements as described in Klaus-Jurgen Bathe "Finite Element Procedures in Engineering Analysis, Prentice-Hall". However, the use of such elements for three dimensional modelling becomes computationally exhaustive and prohibitive for simultaneous inversion in logging while drilling applications.

SUMMARY

Disclosed herein is a method of simulating a borehole response, in particular an acoustic borehole response, in an anisotropic formation, part of the crust of the earth, the method comprising:

formulating a geometric model of the formation, the geometric model comprising a plurality of layers definable in a cylindrical coordinate system defined by an axial direction normal to each of the layers, a radial direction relative to the axial direction, and a circumferential direction relative to the axial direction;

formulating a computational model of wave propagation in the formation, the computational model comprising one or more field variables and a wave equation describing a behaviour of the one or more field variables, wherein the one or more field variables are represented as respective Fourier series expansions of $\pi$-periodic harmonics in the circumferential direction, and numerically solving the computational model.

In particular, embodiments of the method disclosed herein provide a high computational efficiency by which three-dimensional wave equations are solved in cylindrical coordinates even where material anisotropy violates the conditions of axis-symmetry. The improved computational efficiency makes embodiments of the method described herein suitable for real time analysis of logging data while drilling.

Embodiments of the method described herein facilitate analysis of waves inside wellbores drilled through many different strata, each with their own orthotropic velocity characteristics, as long as the material in all layers have a principal axis in common, which to a large degree is a valid assumption for many horizontally layered sedimentary rocks. The common principal axis is generally parallel to the axis of the bore and generally vertical.

In particular, in some embodiments the wave equation includes a stiffness matrix including a plurality of stiffness matrix elements, and numeric computation of the stiffness matrix elements includes numeric computation of integrals of less than three dimensions. In a 3-dimensional system, the elements of the stiffness matrix generally require integration over three spatial dimensions. However, the representation of the field variables as respective Fourier series expansions of $\pi$-periodic harmonics in the circumferential direction allows the integration in the circumferential direction to be performed analytically. Due to fast convergence of the Fourier series full three dimensional analyses can be carried out in an essential 2-dimensional framework, where the Fourier coefficients are nodal degrees of freedom in a standard two dimensional iso-parametric ring-finite-element with a radial/axial plane of reference.

Generally a constitutive material law is expressed as one or more constitutive equations that establish a relation between two physical quantities that is specific to a material or substance, and that approximate the response of that material to external forces. For example, constitutive equations connect applied stresses or forces to strains or deformations. In some embodiments, an elastic anisotropy of each layer of the formation is describable by an orthotropic constitutive material law or another material law that is π-periodic in the circumferential direction. Hence, embodiments of the method described herein apply to cases where the elastic constitutive relation and the boundary conditions are invariant in any rotation, φ, which is a multiple of π. For such cases the resulting field variables are also periodic in π, and by means of expanding the field variables in Fourier series in the circumferential direction, the full 3-dimensional problem can be efficiently solved in cylindrical coordinates without loss of generality.

The computational model may be solved numerically, e.g. by a finite element method or another suitable numerical method. In some embodiments, the method further comprises computing at least one physical property from the numerically solved computational model. From the numerical solution of the computational model, physical properties such as elastic properties of the formation may be determined by way of data inversion. In the context of acoustic measurements this process is also referred to as seismic inversion. Examples of physical properties include a velocity of sound propagation, density, permeability, porosity, resistivity, permittivity, Young's modulus, a component of the tensorial stress-strain properties, shear modulus, amount of water present, and amount of oil and/or other hydrocarbons present.

In particular, in one embodiment, the method comprises determining a model parameter of the computational model by performing an iterative process, the iterative process comprising numerically computing a solution of the computational model for a first value of the model parameter; comparing an output of the solved computational model with the measured data so as to determine an error, selecting a second value of the model parameter so as to reduce the determined error, and repeating the computing and comparing steps for the second value of the model parameter.

The present invention relates to different aspects including the methods described above and in the following, corresponding data processing device, and computer programs, each yielding one or more of the benefits and advantages described in connection with the above-mentioned methods, and each having one or more embodiments corresponding to the embodiments described in connection with the above-mentioned methods.

More specifically, according to another aspect, a data processing system is configured to perform the steps of the method described herein. The term data processing system is intended to comprise any electronic system or device comprising processing means for data processing. In particular, the term processing system is intended to comprise any suitably programmed computer, such as a desktop computer, computer workstation, or the like, or any other electronic equipment including handheld or portable computing devices, such as handheld computers, or the like.

Accordingly, in some embodiments, the features of the methods described above and in the following may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

Hence, according to one aspect, a computer program comprises program code means adapted to cause a data processing device to perform the steps of the method described above and in the following, when said computer program is run on the data processing device. For example, the program code means may be loaded in a memory, such as a RAM (Random Access Memory), from a storage medium or from another computer via a computer network. Alternatively, the described features may be implemented by hardwired circuitry instead of software or in combination with software. The term storage medium is intended to include any circuitry or device suitable for storing digital data items. Examples of such storage media include non-volatile memory, a read-only-memory (ROM), a random access memory (RAM), a flash memory, an Erasable Programmable Read-Only Memory (EPROM), or the like. In some embodiments, the storage medium is included in the processing device.

BRIEF DESCRIPTION OF THE DRAWINGS

The above and other aspects will be apparent and elucidated from the embodiments described in the following with reference to the drawing in which.

DETAILED DESCRIPTION

Figure 1:
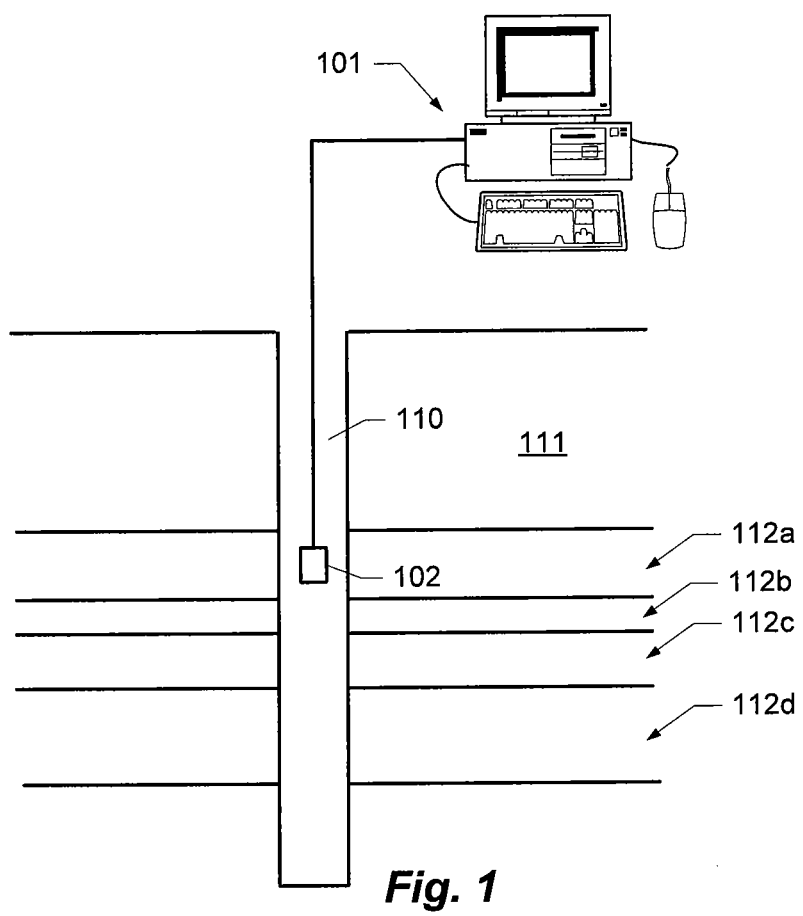
FIG. 1 shows an example of a data processing system for performing embodiments of the method described herein.

FIG. 1 shows an example of a system for performing embodiments of the method described herein. The system includes a computer 101 or other data processing system, and a sensor system 102. The computer 101 may be any suitable computer or other data processing system, e.g. a PC, a workstation, a server computer, etc. Even though illustrated as a single computer, it will be appreciated that computer 101 also may be implemented as a plurality of computers, e.g. as a client/server system including a server computer and a number of client computers connected to the client computer via a suitable computer network.

The sensor system 102 may be a sensor probe that can be inserted into a borehole e.g. suspended by a cable thus allowing for the collection of sensor measurements as a function of depth. The sensor probe may include an acoustic transmitter and an acoustic receiver for emitting an acoustic signal and for receiving a response from the surrounding formation responsive to the emitted acoustic signal. Examples of such sensor systems are disclosed in U.S. Pat. No. 5,387,767, U.S. Pat. No. 5,309,404 and U.S. Pat. No. 4,594,691. The measured sensor data may be represented as a well log recorded during a survey operation in which the sensor probe is lowered into the well bore by a survey cable. While FIG. 1 illustrates a down hole instrument, alternatively other types of well log data may be used, e.g. based on data collected at the surface, or in a cross hole arrangement between different boreholes.

Operation of the sensor system 102 may be controlled by the computer 101 and/or by a different control system (not shown in FIG. 1). In FIG. 1, the sensor system 102 is shown positioned inside a borehole 110 drilled into a rock formation 111 of the crust of the earth, e.g. into a hydrocarbon reservoir. The formation 111 comprises a plurality of horizontally, or at least approximately horizontally, stacked layers 112a-112d, of different types of rock. Hence, the different layers may have different physical properties, in particular different elastic properties. Furthermore, the elastic properties of some or all of the layers may be anisotropic, i.e. each layer may have principal axes of anisotropy, and the principal axes of anisotropy of the respective layers may vary from layer to layer.

The sensor system 102 may be connected to the computer 101 via a data communication interface, e.g. a wired or wireless interface, thus allowing for real-time input of the measured data into the computer 101 and thus real-time simulation and estimation of the physical properties of the formation. It will be appreciated, however, that in some embodiments the collected measurement data may be stored on a suitable storage medium such as a hard disk, a flash memory, an optical disc and subsequently input into the computer 101 for off-line analysis. Similarly, it will be appreciated that the computer may be located at or near the survey or drilling site or at a remote location.

The computer 101 receives the measured data and computes elastic properties of the formation surrounding the borehole by seismic inversion based on the measured data and a computational model as described herein. Examples of suitable models for computer-automated analysis of complex structures such as rock formations include matrix methods that use the formations stiffness relations and displacements in the structure, and apply a finite element method. In applying such a method, the system is generally modelled as a set of simpler interconnected elements. The material stiffness properties of these elements are compiled into a matrix equation which governs the behaviour of the entire modelled structure, in particular a wave equation describing propagation of acoustic waves in the formation. The structure's unknown displacements can then be determined by numerically solving this equation under suitable boundary conditions.

Figure 2:
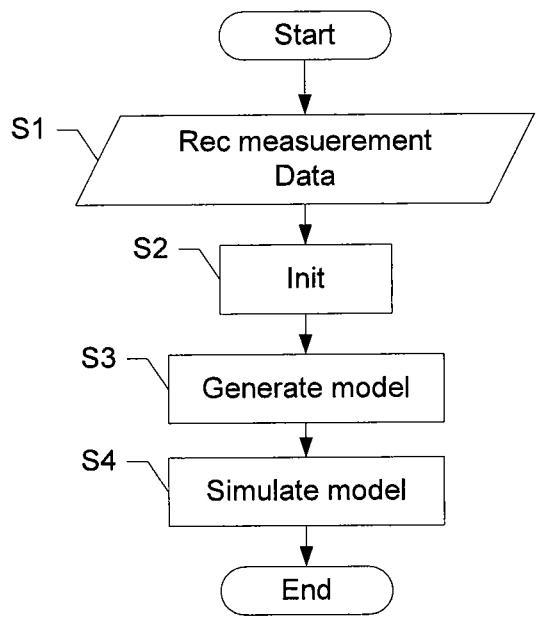
FIG. 2 shows a flow diagram of an example of a method for simulating a borehole acoustic response in an anisotropic formation in the crust of the earth.
Figure 3:
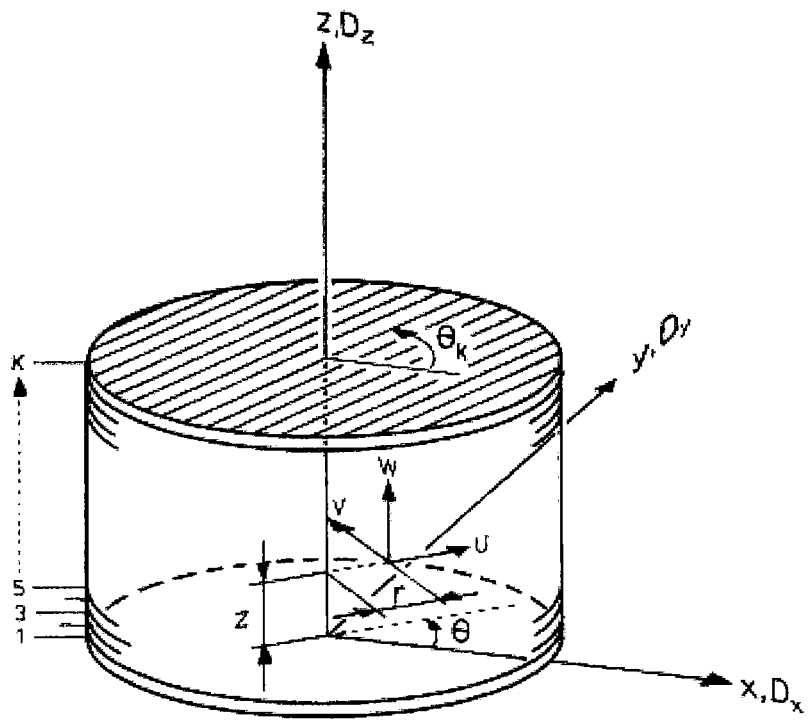
FIG. 3 schematically illustrates a suitable model geometry for formulating a computational model of the layered formation around a borehole through a layered formation.

An embodiment of a method for simulating a borehole acoustic response in an anisotropic formation of the crust of the earth will now be described with reference to FIGS. 2 and 3. FIG. 2 shows a flow diagram of an example of a method for simulating a borehole acoustic response in an anisotropic formation of the crust of the earth. FIG. 3 schematically illustrates a suitable model geometry for formulating a computational model of the layered formation around a borehole through a layered formation.

In initial step S1, the process receives measured acoustic data, e.g. from a sensor system as described in connection with FIG. 1. In step S2, the computational modelling process is initialised. This initialisation step may include the selection of a suitable coordinate system and optionally the selection of one or more operational parameters of the computational model, such as element sizes of a finite element model, etc.

One embodiment of the method described herein makes use of the ring finite element described in Jørgensen, Ole, "Ring-element analysis of layered orthotropic bodies", Comp. Meth. Appl. Mech. Eng, vol 102, pp. 319-336, 1993. It has been realised by the inventor that the above method, which is known as such in the context in the context of laminated fibre-composites, may advantageously be applied to the solution of acoustic wave propagation in rock formations. The disclosed modelling technique was originally developed to model engineered substrates or solids, designed by stacking layers of directional dependent material of dissimilar material orientation. It has been realised by the inventor that from a modelling standpoint such solids have a lot in common with sedimentary rocks, which can be anisotropic and whose axis of anisotropy can change with depth.

The ring-element concept has been applied to bodies of revolution, but this is not a limitation here, since the wave field is sought in a semi-infinite medium. Owing to anisotropy, the material that forms the crust does not show rotational symmetry. The directional dependence does, however, show $\pi$-periodicity and provided that the boundary conditions, i.e. at the surface of the hole and at infinity, preserve this periodicity, the resulting displacement field can be Fourier expanded in terms of $\pi$-periodic harmonics without loss of generality, (see Jørgensen, ibid.).

FIG. 2 schematically illustrates the model geometry. The rock formation is modelled is a series of K stacked layers. The model may conveniently be expressed in cylindrical coordinates where the z-axis is normal to the layers.

Again referring to FIG. 1 and with continued reference to FIG. 2, the process continues at step S3 and formulates a computational model of the formation under investigation.

For the purpose of the present description, let u, v and w denote the radial, circumferential and axial component of the displacements, respectively.

$$u(r, z, \theta) = \sum_{n=0}^{N} u_n^c(r, z)\cos(2n\theta) + \sum_{n=0}^{N} u_n^s(r, z)\sin(2n\theta) \quad (1)$$

$$v(r, z, \theta) = \sum_{n=0}^{N} v_n^c(r, z)\cos(2n\theta) + \sum_{n=0}^{N} v_n^s(r, z)\sin(2n\theta)$$

$$w(r, z, \theta) = \sum_{n=0}^{N} w_n^c(r, z)\cos(2n\theta) + \sum_{n=0}^{N} w_n^s(r, z)\sin(2n\theta)$$

The superscripts c and s denote the corresponding amplitudes in the cosine and sine terms, respectively, of the above Fourier expansions, which are complete. Hence, in general, embodiments of the method disclosed herein apply eqn. (1) to the finite element modelling as a part of wellbore seismic inversion problems, whereby the field variables are referred to a radial-axial plane of reference although the field is not axis-symmetric.

The benefits of this method include the high rate of convergence of the above series, which means that the series usually converge for N<4, even for strong anisotropy and discontinuous shifts in anisotropy along the z-axis.

The generalised displacements used in deriving the finite element system equations are:

$$\{d\}^T = \{u_n^c, u_n^s, v_n^c, v_n^s, w_n^c, w_n^s\} \quad (2)$$

The integration of the stiffness matrix, [S], with respect to the circumferential direction involves triple products of harmonical functions of $\theta$. This is due to the displacement assumption and also due to directional dependence of the stress-strain relation, see (e.g. Jørgensen (ibid.)). The mathematical expressions for the integration is derived in details in Jørgensen (ibid.); note that the number of degrees of freedom at the element level depends on the truncation number N. After integration and assembly of the system stiffness matrix the equation of free oscillation of the solid reads:

$$[S]\{d(t)\} + [M]\{\ddot{d}(t)\} = \{0\} \quad (3)$$

Where $\{d(t)\}$ denotes the time dependent generalised displacement field, $[S]$ and $[M]$ are the stiffness and mass matrices.

In frequency domain the same equations of free motion read:

$$[S]\{d\}-\omega^2[M]\{d\}=\{0\} \quad (4)$$

where $\omega$ is the angular frequency. Likewise for the fluid phase inside the wellbore, the wave equation in frequency domain reads:

$$[S_{fluid}]\{p\}-\omega^2[M_{fluid}]\{p\}=\{0\} \quad (5)$$

Where $[S_{fluid}]$ and $[M_{fluid}]$ are the fluid stiffness and mass matrices respectively and $\{p\}$ is the acoustic field and $\omega^2$ is the eigen frequency squared. As opposed to the solid phase where displacement is used as primary variable, the primary variable is pressure, p, in the fluid phase. The coupling of the formation to the fluid filled well bore is through appropriate boundary conditions between the fluid and the solid phase. In the Finite element formulation the coupling can be expressed by the matrix $[Q]$, which can be derived as described in "Effects of tool eccentricity of wave dispersion properties in borehole acoustic logging while drilling", by Yibing Zheng and M. Nafi Toksoz, Consortium Report, 2004, Earth Resources Laboratory Dept. Of Earth, Atmospheric, and Planetary Sciences, Massachusetts Institute of Technology Cambridge, Mass. 02139. In short, continuity of fluid and solid particle velocities at the surface of the borehole, and continuity in forces normal to this boundary, defines the coupling $[Q]$ and in frequency domain the coupled equations of motion reads:

$$\begin{bmatrix} S & -Q \\ 0 & S_{fluid} \end{bmatrix}\begin{Bmatrix} d \\ p \end{Bmatrix} - \omega^2 \begin{bmatrix} M & 0 \\ Q^T & M_{fluid} \end{bmatrix}\begin{Bmatrix} d \\ p \end{Bmatrix} = \{0\} \quad (6)$$

In step S4, the process numerically computes a solution to the generated computational model. Eqn. (6) is the wave equation in frequency domain from which eigen-frequencies and eigen-modes of non-attenuated modes inside the borehole can be calculated.

The modelling of an acoustic source and receiver is a matter of positioning those as they are located in a real tool, e.g. in the sensor system 102. Wavelet functions f(t) are applied at the source position and wave propagation inside the borehole can be simulated by finite difference approximation in the time domain. For this type of analysis the system equations have the form:

$$\begin{bmatrix} S & -Q \\ 0 & S_{fluid} \end{bmatrix}\begin{Bmatrix} d(t) \\ p(t) \end{Bmatrix} - \begin{bmatrix} M & 0 \\ Q^T & M_{fluid} \end{bmatrix}\begin{Bmatrix} \ddot{d}(t) \\ \ddot{p}(t) \end{Bmatrix} = \{f(t)\} \quad (7)$$

Where f(t) is the wavelet function. These equations can be numerically solved for d(t) and p(t) and simulated waveforms at the receivers' position can then be compared directly to those acquired in real logging analysis.

The sensitivity of for instance acoustic dispersion or waveforms to the stress-strain relationship for sedimentary rocks can be analysed using the proposed finite element formulation, also in cases where complex acoustic anisotropy with depth variations is present in the formation. Consequently, the analyses can be used to invert elastic properties for such cases. To set up a problem as an inversion is possible with either of the formulations of eqn. (6) or (7).

In the following an example of inversion in the frequency domain is given. To this end we will consider cross-dipole logging of a borehole. The standard configuration of a cross-dipole logging tool is that of exciting waves by two pairs of dipole sources and receiving and recording waves by eight pairs of dipole receivers. When the borehole is excited with a dipole source a set of guided waves and refracted shear and compressional waves are formed. If the formation is isotropic the formation's acoustic response would be axis-symmetric, but in the case of an anisotropic $\pi$-periodic formation, the response is $\pi$-periodic as discussed above. The guided modes of lowest frequency are flexural modes which are polarized in the x-y plane perpendicular to the borehole axis. For anisotropic formations the modes split into a fast and slow component. The receivers permit measurements of the formations response and identification of a number of say M flexural modes and a spectrum comprising of M frequencies, $(\bar{\omega}_1^2, \bar{\omega}_2^2, \ldots, \bar{\omega}_M^2)$, can be identified.

The numerical model of the bore hole also permits identification of flexural modes and eigen frequencies. To this end the solution of equation (6) may be performed by any suitable numerical method for solving eigen value problems, e.g. as described in Klaus-Jurgen Bathe "Finite Element Procedures in Engineering Analysis, Prentice-Hall". (Chapter 11). For a system of N degrees of freedom, the eigen solution comprises of N eigen values $(\omega_1^2, \omega_2^2, \ldots, \omega_N^2)$ and the corresponding N eigen vectors $$\begin{Bmatrix} d \\ p \end{Bmatrix}_1, \begin{Bmatrix} d \\ p \end{Bmatrix}_2, \ldots ; \begin{Bmatrix} d \\ p \end{Bmatrix}_N \quad (8)$$

An inversion is now exemplified by minimising the difference between the M measured eigen frequencies and the corresponding simulated eigen frequencies. To this end we define the object function, P:

$$P = \sum_{i=1}^{M}\left(1 - \frac{\omega_i^2}{\bar{\omega}_i^2}\right) \quad (9)$$

Let furthermore $\alpha_i$, denote a set of elastic parameters of the formation to be estimated. These parameters could for instance be layer moduli, layer by layer axis of anisotropy etc. Note that by the finite element method the matrix $[S]$ is in general differentiable with respect to $\alpha_i$, and the derivative of the eigen frequencies with respect to parameter $\alpha_i$, are expressed as:

$$\frac{\partial \omega_j^2}{\partial \alpha_i} = \frac{\begin{Bmatrix} d \\ p \end{Bmatrix}_j^T \begin{bmatrix} \frac{\partial S}{\partial \alpha_i} & Q \\ 0 & S_{fluid} \end{bmatrix}\begin{Bmatrix} d \\ p \end{Bmatrix}_j}{\begin{Bmatrix} d \\ p \end{Bmatrix}_j^T \begin{bmatrix} M & 0 \\ Q^T & M \end{bmatrix}\begin{Bmatrix} d \\ p \end{Bmatrix}_j} \quad (10)$$

By making use of equation (10) we can write the derivative of the object function:

$$\frac{\partial P}{\partial \alpha_j} = -\sum_{i=1}^{M} \frac{1}{\bar{\omega}_i^2} \frac{\partial \omega_i^2}{\partial \alpha_j} \quad (11)$$

This gradient provides the direction of steepest descend in $\alpha_i$ space. Hence, a combination of $\alpha_i$, which minimises the object function P can be found by iteratively minimising P by varying $\alpha_i$.

Although some embodiments have been described and shown in detail, the invention is not restricted to them, but may also be embodied in other ways within the scope of the subject matter defined in the following claims.

The method, product means, and device described herein can be implemented by means of hardware comprising several distinct elements, and by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method of predicting properties of an anisotropic formation in the crust of the earth, the formation including a rock formation comprising a plurality of elastically anisotropic layers, the plurality of elastically anisotropic layers of the formation being orthotropic materials being $\pi$-periodic in the circumferential direction, the method comprising:

receiving acoustic sensor measurements from a sensor system provided in a borehole, the sensor system comprising a transmitter and a receiver and being configured to emit an acoustic signal and receive an acoustic response from the surrounding formation responsive to the emitted acoustic signal;

collecting the acoustic sensor measurements as a function of depth of the borehole;

formulating, based on the acoustic sensor data, a model geometry of the formation, the model geometry comprising a plurality of elastically anisotropic layers definable in a cylindrical coordinate system defined by an axial direction normal to each of the layers, a radial direction relative to the axial direction, and a circumferential direction relative to the axial direction, the elastic anisotropy of each layer of the formation being describable by an orthotropic material law being theta dependent and $\pi$-periodic in the circumferential direction, each layer having its own orthotropic velocity characteristics;

formulating a computational model of wave propagation in the model geometry of the formation, the computational model comprising one or more field variables, the one or more field variables including a time-dependent displacement field, wherein a wave equation describing wave propagation in the plurality of elastically anisotropic layers and a behaviour of the one or more field variables is described by the time-dependent displacement field, a stiffness matrix and a mass matrix representing the orthotropic elastic properties and the mass of the formation and wherein the one or more field variables are theta dependent and represented as respective coupled Fourier series expansions of $\pi$-periodic harmonics in the circumferential direction, the resulting propagating waves or modes derived from the wave equation being likewise coupled; and numerically solving the computational model, to thereby predict one or more physical properties of the formation selected from the list of properties including: a velocity of sound propagation through the formation, a density of the formation, a permeability of the formation, a porosity of the formation, a resistivity of the formation, a permittivity of the formation, and a Young's modulus of the formation.

2. The method according to claim 1, wherein the plurality of anisotropic layers are showing no rotational symmetry.

3. The method according to claim 1, wherein the computational model is a 3-dimensional computational model.

4. The method according to claim 1, wherein the borehole has a longitudinal direction along the axial direction.

5. The method according to claim 1, wherein the wave stiffness matrix includes a plurality of stiffness matrix elements, and numerically solving the computational model comprises numerically computing one or more of the stiffness matrix elements.

6. The method according to claim 5, wherein numeric computation of each of the stiffness matrix elements to be numerically computed includes numeric computation of integrals, wherein each integral to be numerically computed has less than three dimensions.

7. The method according to claim 1, wherein the borehole response is a borehole acoustic response.

8. The method according to claim 7, wherein the wave equation describes propagation of an acoustic wave through the formation outside and inside a borehole.

9. The method according to claim 1, wherein the method further comprises computing at least one elastic property from the numerically solved computational model.

10. The method according to claim 9, wherein computing at least one elastic property from the numerically solved computational model is performed by data inversion.

11. The method according to claim 10, wherein computing at least one elastic property from the numerically solved computational model comprises determining an eigensolution of the computational model.

12. The method according to claim 9, wherein computing at least one elastic property from the numerically solved computational model comprises determining an eigensolution of the computational model.

13. The method according to claim 12, wherein computing at least one elastic property from the numerically solved computational model comprises
determining a set of parameters of the eigensolution;
receiving corresponding measured values of said set of parameters;
computing an objective function indicative of a difference between the determined parameters of the eigensolution and the corresponding received measured parameters; and
computing a value of the elastic property that at least approximately minimizes the computed objective function.

14. The method according to claim 13, wherein the set of parameters is a set of eigenfrequencies.

15. The method according to claim 1, wherein the method comprises determining a model parameter of the computational model by performing an iterative process, the iterative process comprising numerically computing a solution of the computational model for a first value of the model parameter; comparing an output of the solved computational model with the measured data so as to determine an error, selecting a second value of the model parameter so as to reduce the determined error, and repeating the computing and comparing steps for the second value of the model parameter.

16. The method according to claim 1, wherein the computational model is a finite element model.

17. The method according to claim 16, wherein the finite element model comprises ring-shaped elements arranged around the axial direction.

18. The method according to claim 1, wherein numerically solving the computational model comprises computing one or more expansion coefficients of the Fourier series by applying the wave equation to the respective Fourier series.

19. The method according to claim 1, wherein the one or more field variables further includes a time-dependent pressure field, and wherein the wave equation describing the behaviour of the one or more field variables and wave propagation in the plurality of elastically anisotropic layers is being further defined by the time-dependent pressure field times a fluid stiffness matrix and a fluid mass matrix, respectively.

20. The method according to claim 19, wherein the displacement field is a generalized displacement field.

21. The method according to claim 1, wherein the wave equation is described by the following equation:

$$[S]\{d(T)\}+[M]\{d(t)\}=\{0\},$$

wherein d(t) denotes a time dependent generalised displacement field, [S] denotes the stiffness matrix and [M] denotes the mass matrix.

22. The method according to claim 1, wherein the wave equation is a time-frequency dependent wave equation.

23. A non-transitory computer readable medium comprising instruction code for predicting properties of an anisotropic formation in the crust of the earth, the formation including a rock formation comprising a plurality of elastically anisotropic layers, the plurality of elastically anisotropic layers of the formation being orthotropic materials being π-periodic in the circumferential direction, the instruction code being executable by a machine to cause the machine perform acts of:
  formulating, based on received acoustic sensor data, a geometric model geometry of the formation, the geometric model geometry comprising a plurality of elastically anisotropic layers definable in a cylindrical coordinate system defined by an axial direction normal to each of the layers, a radial direction relative to the axial direction, and a circumferential direction relative to the axial direction, the elastic anisotropy of each layer of the formation being describable by an orthotropic material law being theta dependent and π-periodic in the circumferential direction, each layer having its own orthotropic velocity characteristics;
  formulating a computational model of wave propagation in the model geometry of the formation, the computational model comprising one or more field variables, the one or more field variables including a time-dependent displacement field, wherein a wave equation describing wave propagation in the plurality of elastically anisotropic layers and a behaviour of the one or more field variables is described by the time-dependent displacement field, a stiffness matrix and a mass matrix representing the orthotropic elastic properties and the mass of the formation, wherein the one or more field variables are theta dependent and represented as respective coupled Fourier series expansions of π-periodic coupled harmonics in the circumferential direction, the resulting propagating waves or modes derived from the wave equation being likewise coupled; and
  numerically solving the computational model, to thereby predict one or more physical properties of the formation selected from the list of properties including a velocity of sound propagation through the formation, a density of the formation, a permeability of the formation, a porosity of the formation, a resistivity of the formation, a permittivity of the formation, and a Young's modulus of the formation.

24. A data processing system for predicting properties of an anisotropic formation in the crust of the earth, the formation including a rock formation comprising a plurality of elastically anisotropic layers, the plurality of elastically anisotropic layers of the formation being orthotropic materials being π-periodic in the circumferential direction, the data processing system comprising:
  a processor; and
  at least one instruction storage device coupled to the processor, where the at least one instruction storage device includes instruction code executable by the processor to cause the processor perform acts of:
  formulating, based on received acoustic sensor data, a model geometry of the formation, the model geometry comprising a plurality of elastically anisotropic layers definable in a cylindrical coordinate system defined by an axial direction normal to each of the layers, a radial direction relative to the axial direction, and a circumferential direction relative to the axial direction, the elastic anisotropy of each layer of the formation being describable by an orthotropic material law being theta dependent and π-periodic in the circumferential direction, each layer having its own orthotropic velocity characteristics;
  formulating a computational model of wave propagation in the model geometry of the formation, the computational model comprising one or more field variables, the one or more field variables including a time-dependent displacement field, wherein a wave equation describing wave propagation in the plurality of elastically anisotropic layers and a behaviour of the one or more field variables is described by the time-dependent displacement field, a stiffness matrix and a mass matrix representing the orthotropic elastic properties and the mass of the formation and wherein the one or more field variables are theta dependent and represented as respective coupled Fourier series expansions of π-periodic coupled harmonics in the circumferential direction, the resulting propagating waves or modes derived from the wave equation being likewise coupled; and
  numerically solving the computational model, to thereby predict one or more physical properties of the formation selected from the list of properties including: a velocity of sound propagation through the formation, a density of the formation, a permeability of the formation, a porosity of the formation, a resistivity of the formation, a permittivity of the formation, and a Young's modulus of the formation.

* * * * *